(12) United States Patent
Weinshall et al.

(10) Patent No.: US 6,993,179 B1
(45) Date of Patent: Jan. 31, 2006

(54) STRAPDOWN SYSTEM FOR THREE-DIMENSIONAL RECONSTRUCTION

(75) Inventors: Daphna Weinshall, Cronton-on-Hudson, NY (US); Mi-Suen Lee, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 718 days.

(21) Appl. No.: 09/633,760

(22) Filed: Aug. 7, 2000

(51) Int. Cl.
*G06K 9/00* (2006.01)

(52) U.S. Cl. .................... 382/154; 356/611; 356/243.1

(58) Field of Classification Search ................ 382/154, 382/103, 106, 284, 294, 285; 345/419, 420; 348/42, 47, 50, 48; 356/12, 14, 3, 631, 611, 356/243.1; 250/559.23, 559.31
See application file for complete search history.

(56) References Cited

U.S. PATENT DOCUMENTS

| | | | |
|---|---|---|---|
| 4,099,880 A * | 7/1978 | Kano | 356/611 |
| 5,386,299 A | 1/1995 | Wilson et al. | 358/406 |
| 5,856,844 A * | 1/1999 | Batterman et al. | 348/207.99 |
| 6,081,273 A | 6/2000 | Weng et al. | 345/425 |
| 6,175,647 B1 * | 1/2001 | Schick et al. | 382/154 |
| 6,377,701 B1 * | 4/2002 | Ohki | 382/154 |
| 6,437,823 B1 * | 8/2002 | Zhang | 348/187 |
| 6,510,244 B2 * | 1/2003 | Proesmans et al. | 382/203 |
| 2005/0068523 A1 * | 3/2005 | Wang et al. | 356/243.1 |

OTHER PUBLICATIONS

"From Ordinal to Euclidean Reconstruction with Partial Scene Calibration", by D. Weinshall et al., Springer LNCS: 3D Structure from Multiple Images of Large Scale Environments, Jun. 1998.
US 000116, U.S. Appl. No. 09/572,991, filed May 17, 2000.
"Camera Self-Calibration from one Point Correspondance", by Ali Azarbayejani et al., MIT Media Laboratory, Technical Report #341.
Zhang Zhongfei et al; "Scaled Euclidean 3D Reconstruction Based on Externally Uncalibrated Cameras", Proceedings International Symposium on Computer Vision (Cat. No. 95TB100006), Proceedings of International Symposium on Computer Vision-ISCV, Coral Gables, FL, Nov. 21-23, 1995, pp. 37-42, XP002228871.

* cited by examiner

*Primary Examiner*—Samir Ahmed
(74) *Attorney, Agent, or Firm*—Larry Liberchuk (57) ABSTRACT

The shape of a three-dimensional object is determined from uncalibrated stereo images by first determining the projection of the point on a reference plane. The distance of each point from the reference plane is obtained by a technique that makes use of a calibration based on two known points visible in each camera's field of view. The method requires only one high precision measurement, which is the depth of the two calibration points from a reference plane. These may be supplied in a setup apparatus thereby avoiding the need for a user to make measurements. The rest of the required calibration data may be derived directly from the images of the cameras.

14 Claims, 5 Drawing Sheets

Fig. 6

STRAPDOWN SYSTEM FOR THREE-DIMENSIONAL RECONSTRUCTION

BACKGROUND OF THE INVENTION

1. Field of the Invention

The invention relates to three-dimensional modeling of shapes based on images of the same object acquired by a pair of cameras.

2. Background

Inputting information about the shapes and positions of objects in a three-dimensional scene is a difficult and tedious task without the help of automation. Such information is useful in three-dimensional animation, machine vision (shape analysis/recognition as in quality control of manufactures), analysis of the dynamics of events from auto collisions to animal behavior, as well as user-interfaces which rely on gesture recognition, and bio-authentication. The applications are tremendous. There are also methods that provide some of the benefits of three-dimensional modeling using pure visual data, such as by morphing an image from one vantage to another to create the effect of panning, but these fall far short of the power of true three-dimensional modeling.

SUMMARY OF THE INVENTION

Using the invention, three-dimensional reconstruction based on multiple camera images can be performed in settings where precise measurement, calibration, and positioning of equipment are difficult. For example, in consumer products such reconstruction could be used as part of a user-interface or in field-use where the speed with which a system can be set up is important, such systems are normally cumbersome. The invention provides components by which a multiple-camera three-dimensional reconstruction may be calibrated easily and with no technical knowledge.

Two embodiments are described for calibrating the setup and using it to calculate the positional data for unknown points. The physical apparatus may be usable with other calculation techniques. In one of the two exemplary embodiments, the calibration procedure determines the camera image optical centers (location of pinhole of equivalent pinhole camera), from reference markers whose positions are known, by triangulation and the location data is used to determine the coordinates of the unknown points from the camera images. In the other embodiment, the calibration provides an algorithm by which distances from a reference plane of unknown points are calculated, the algorithm being derived from the distance of a pair of reference markers from the reference plane. In either embodiment, the two markers may be employed to calibrate the setup and thereafter removed from the scene, enabling the system to be used to determine the position or depth of any unknown point in the same visual field.

In one embodiment of the calibration apparatus, each camera views a scene from behind a polygonal aperture that is always visible in the image peripheral field. The apertures both lie in a common reference plane. In the initial setup procedure, a frontal image (looking toward the cameras and their respective apertures) is taken to obtain a narrow field of view approximating orthographic projection. This represents the two-dimensional undistorted appearance of the reference plane. The two images of the cameras, during depth calculation, are warped by planar projection transform to the reference plane such as to register the boundaries of the apertures into perfect alignment. This planar projection transform is calculated during the setup procedure and does not have to be repeated.

Also during the setup procedure, a device is placed in the scene that is effective to position markers in a predefined position with respect to the reference plane. In the first calculation embodiment, the three coordinates of the markers are known. In the second calculation embodiment, only the distances from the plane (depths) of the markers are known.

In the first calculation embodiment, during calibration, from the three-dimensional coordinates of the calibration markers are used to calculate the optical centers of the cameras with respect to the reference plane. To do this, each marker's image in each camera is warped to the reference plane using the transform that maps the corners of the camera's aperture to the corresponding points in the orthogonal view of the reference plane. Each camera's image of the markers maps to a pair of points on the reference plane, which cross at the optical center of the camera. Once known, the optical centers can be used thereafter to triangulate the position of any unknown point from the image of the unknown points warped to the reference plane.

In the second calculation embodiment, where only the depth of the calibration markers with respect to the reference plane are known, the depth with respect to the reference plane of the unknown point can be determined by less straightforward means. An algorithm for this technique is given in the main part of the specification.

The system can be implemented using no information about the location of the cameras or optics except for certain fixtures used for calibration and so is suitable for rapid and convenient setup. The only calibration setup that is required, aside from approximate alignment of images in a scene, is the precise positioning of a pair points relative to the reference plane. This may be provided by a fixture such as an extendable boom with a pair of markers at different positions. This would allow a consumer, for example, to set the system up in the home.

The determination of the depth of an unknown point with respect to the reference plane follows an algorithm given in Weinshall, D., Ananda, P., Irani, M, "From ordinal to Euclidean reconstruction with partial scene calibration," in Springer LNCS: 3D Structure from Multiple Images of Large Scale Environments, June, 1998, the entirety of which is hereby incorporated by reference as if fully set forth herein.

The methods described can be used to create a "strapdown" setup for modeling three-dimensional scenes. The necessary registration information can be placed in a three-dimensional scene by means of a few interconnected components and the cameras. For example, a panel with apertures representing the reference plane, for example, can be set up in front of the cameras in a peek-through configuration. The panel can have an extendable wand or other temporary device that places in the scene a pair of visible spots at predefined distances from the reference plane. The wand may be extended into the scene temporarily during calibration and then removed. Alignment of cameras and the creation of the reference frame image do not require precise positioning of the cameras or precise information about the alignment or positioning of the cameras.

Because the setup procedure is simple, requires no data input or high precision, it can be used in environments where such features add value. For example, the system can be made into a portable kit that can be set up quickly at a temporary location, for example by a field engineer for analyzing objects or a presenter as part of a gesture-based user-interface. The system can be shipped to consumers for set up in the home where it can form the basis of a user interface for control of smart appliances or advanced communication devices. The application of this technology are numerous and varied, encompassing nearly every application of machine-vision both current and yet to be realized.

The calibration and setup can also be done by feeding position information from one camera to another so that the relative alignment and position can be determined. For example, each camera could be equipped to transmit a collimated beam at the other. The coarse alignment could be achieved by having the user aim each camera's beam at the detector of the other camera and the precise error determined by detecting where the beam falls on each camera's detector. Given the precise alignment of the two cameras, an arbitrary reference plane can be determined. Alternatively, a jig that holds the cameras in precise alignment may be used. These alternatives, however, do not have the advantage of the preferred configuration which compensates for alignment and image differences between the cameras with the only assumption being that each camera forms an image through an optical center (the pinhole-camera ideal). Thus, the first embodiment, in which the cameras peek through apertures in the reference plane and a single image of the reference plane and apertures are used, is preferred.

Note that the method is not limited to the use of two cameras and can employ any number of cameras observing overlapping features of a scene. The image data from overlapping images can be used to reduce random error. A larger number of cameras can also be used to increase the effective field of view of the system.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1A:
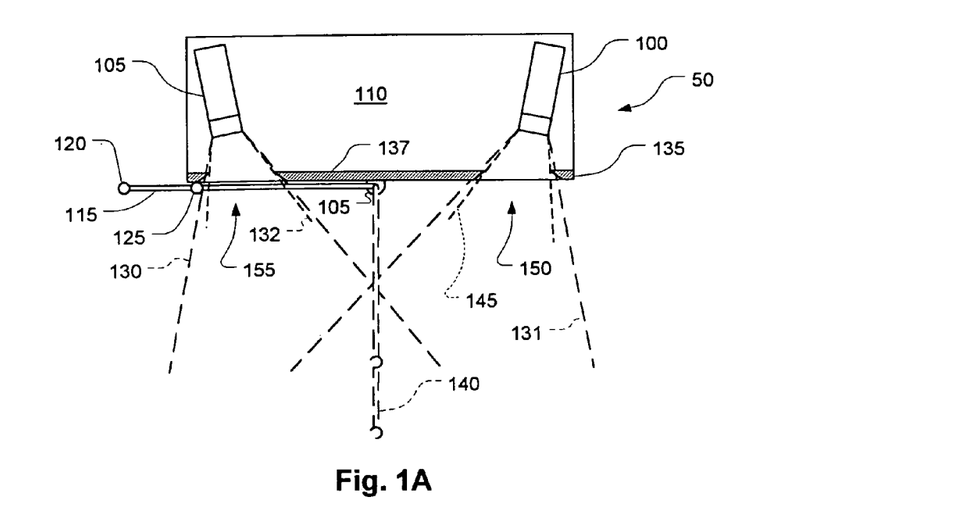
FIG. 1A is a plan view of a jig for implementing an embodiment of the invention.
Figures 1B, 1C:
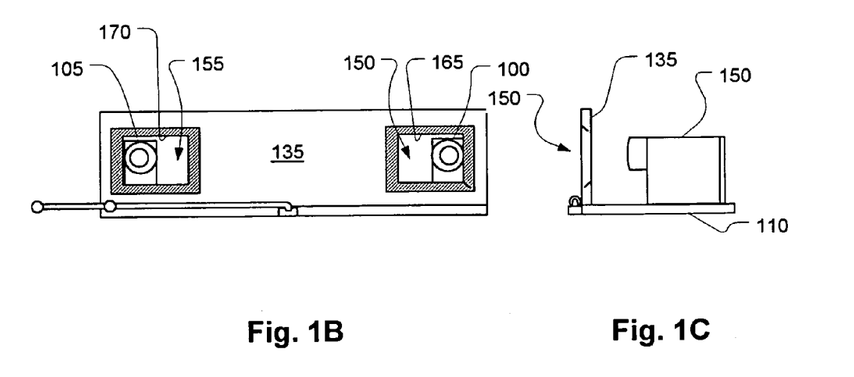
FIG. 1B is a front elevation of the jig of FIG. 1A.
FIG. 1C is a side elevation of the jig of FIGS. 1A and 1B.

Referring to FIGS. 1A, 1B, and 1C, a pair of cameras 100 and 105 are placed on a table 110 to which is attached a screen 135 with apertures 150 and 155. The camera 100 is aimed at a scene in front of the screen so that the camera 100 views the scene through the aperture 150. The camera 105 is aimed at the scene so that it views the scene through the aperture 155. The cameras 100 and 105 are aimed through the apertures 150 and 155 so that the inside edges of the frames 165 and 170 of the apertures 150 and 155 are contained in each image, respectively. Thus, the field of view 130 of the camera 105 is slightly clipped by the aperture reducing its effective field of view to that illustrated by the dashed lines at 132. Similarly for camera 100, the field of view 131 is slightly clipped as illustrated at 145.

A boom 115 can be swung into the fields of view of both cameras so that it is positioned as shown at 140. The boom has a pair of markers 120 and 125 at different distances from the screen 110 along its length. When swung into the extended position 140, both markers are visible in each camera's image.

The markers 120 and 125 are located at known positions relative to the inside edges 170/165 of the screen 135. Either the three-dimensional coordinates of the markers are used or the distance from the reference plane is used, depending on whether the three-dimensional coordinates of the unknown point is desired or only the depth. If the former, the camera optical centers are calculated and the unknown point solved by triangulation from the camera optical centers and the coordinates of the unknown point warped to the reference frame. If the latter, an algorithm described below is used.

Figure 1D:
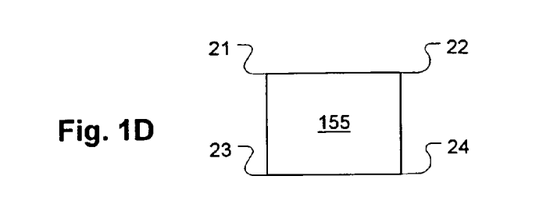
FIG. 1D is an illustration of the outline of an aperture in the jig of FIGS. 1A–1C.

Referring also to FIG. 1D, the four points defined by the corners 21, 22, 23, and 24 of the apertures 150 and 155 are all located in a plane defined by the inside surface 137 of the screen. This inside surface 137, in this embodiment, defines the reference plane. With these four coordinates in each image and the location data regarding the markers, the system can be calibrated such as to allow the three-dimensional coordinates or depth of any point in the scene (the can be seen by both cameras) to be determined.

To map points to the reference plane requires an image of apertures from a distance and substantially perpendicular to the screen 135. The coordinates in the reference frame are defined with respect to this image. This image need only be generated once during setup. The image must show the four points of each camera's aperture, so that the correct transform can be calculated. This transform is calculated substantially as described in U.S. patent Ser. No. 09/572,991 filed May 17, 2000 entitled "Apparatus and Method for Indicating a Target by Image Processing Without Three-Dimensional Modeling" the entirety of which is hereby incorporated by reference as if fully set forth herein. Using this transform, any point in a camera's image may be warped to the reference plane.

Figure 4:
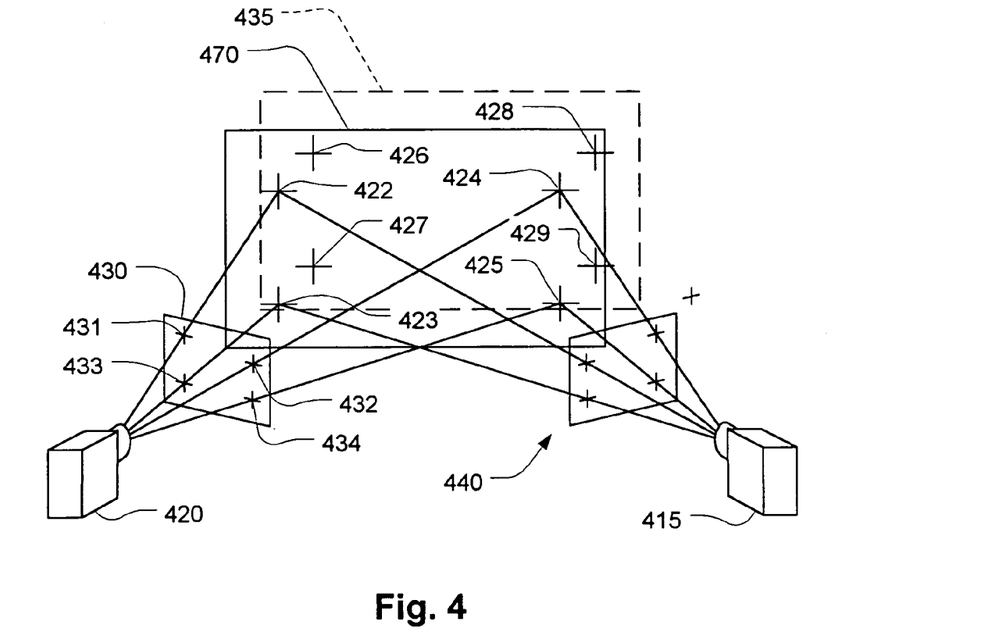
FIGS. 4, 5, and 6 are illustrations of steps in the calibration process used to support the triangulation method.

An analogous method, which may also be used, is illustrated in FIG. 4 where the four reference markers 422, 423, 424, 425 are placed on a reference plane 470 positioned such that the same four reference markers are visible to each camera 415, 420. Each camera has four reference marker images 431, 432, 433, 434 in a respective image plane 430 (and 440 for camera 415). These marker images are used to calculate the transform to a reference frame 435, which is a planar projection of the reference plane 470.

Figure 5:
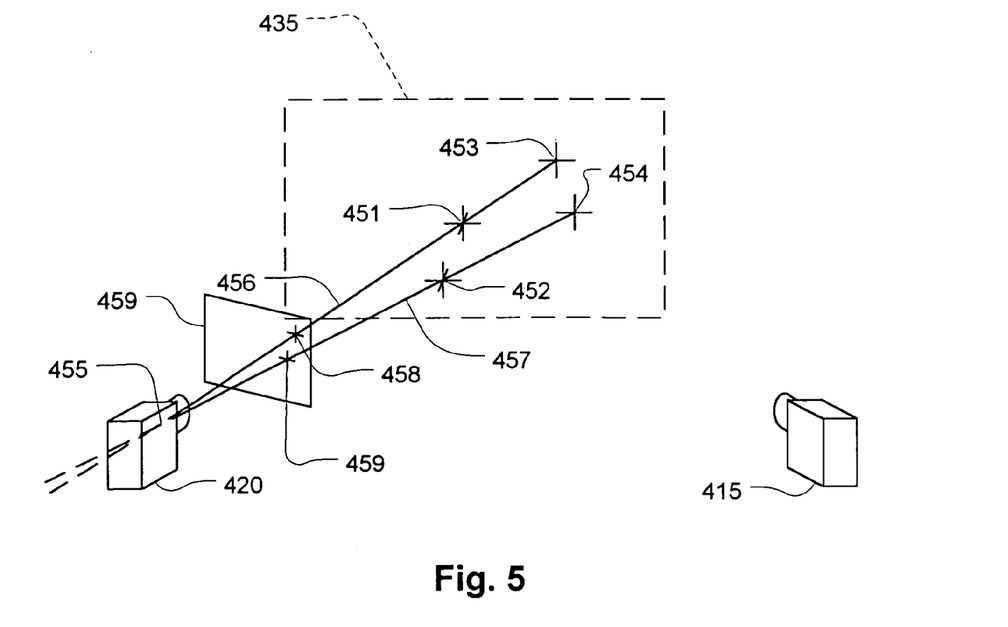

Referring to FIG. 5, in the first calculation embodiment, the images (432, 434) of the markers 451 and 452 whose positions are known are transformed to the reference plane 453, 454. Using the known coordinates of the markers and the coordinates of the transformed images of the markers, the optical center (455 for camera 420) of each camera can be determined. The above completes the calibration procedure for the first calculation embodiment.

Figure 6:
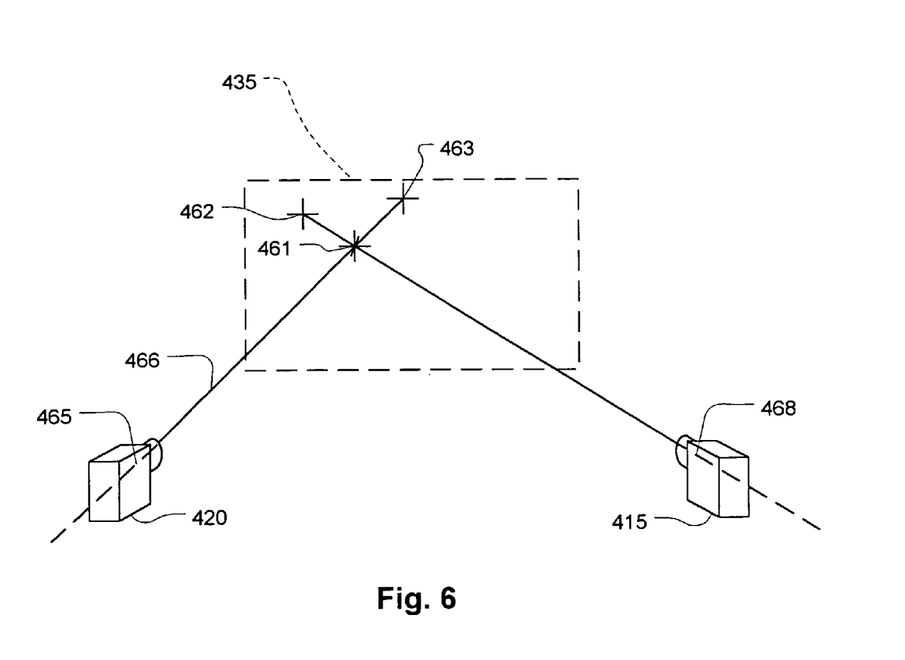

Referring to FIG. 6, using the known positions of the optical centers of the cameras, any unknown is warped to the reference plane to obtain an image coordinates in the reference plane. The unknown point warped to the reference from each camera results in respective images 462, 463, one for each camera. The position of the unknown point can then be solved by triangulation, as illustrated.

In the second calculation embodiment, the determination of the depth of an unknown point, given the depth of the markers, both with respect to the reference plane, begins X coordinate of one of the marker points in the first camera 100 image and q(2,j) is the Y coordinate of the other of the marker points in the second camera 100 image. The letter Z represents the depth, or the distance from the reference plane, of a point. The X and Y coordinates of the unknown point k are obtained in the reference frame by calculating the planar projection transform that maps the respective corner points of the aperture to the corresponding points in the reference image. The line joining the image point and the epipole are then transformed using that transform for each image. The intersection of these two lines indicates the location of the unknown point in the reference plane coordinates. Next, the depth of the unknown point is calculated by taking the singular value decomposition (SVD) of the following matrix.

$$\begin{pmatrix} p(2,i)- & -(p(1,i)- & \dfrac{p(1,i)^*}{p(2,j)-} \\ p(2,j), & p(1,j)), & p(2,i)^* \\ & & p(1,j), \end{pmatrix} \quad 0, \quad 0, \quad 0, \quad 0, \quad 0, \quad 0$$

(matrix as shown in figure with rows defining the SVD system)

with planar projection transformation of the inhomogeneous coordinates of the unknown point and the two calibration points in the respective images to the reference plane. The following variables are defined: p represents points in the image of the first camera 100, q represents points in the image of the second camera 105, i represents the first marker and j the second marker. The row index of a shape matrix p, representing points in the first camera 100 image, represents the axis (X=1 and Y=2) and the column index of the matrix p the point to which the coordinates of correspond. Similarly, the row index of a shape matrix q, representing points in the second camera 105 image, represents the axis (X=1 and Y=2) and the column index of the matrix q the point to which the coordinates of correspond. The letters, i and j represent the points corresponding to the markers 120 and 125 and the letter k to the unknown point. Thus, p(1,i) is the The ratio u=V(6,9)/V(3,9) (i.e., sixth row, ninth column value divided by the third row ninth column value) of the V $$Z(k) = \dfrac{Z(i)}{\left(1 - u\left(1 - \dfrac{Z(i)}{Z(j)}\right)\right)} \qquad \text{Equation 1}$$

matrix of the SVD is equal to the relative depth of the unknown point. The numerical depth is given by Equation 1.

Thus, with the coordinates of the four points defined by the corners of the apertures 150 and 155 for each image and the distances of the markers 120 and 125 from the inside plane 137 of the screen 135, the distance of any point in both camera images can be calculated. Note that the transforms can be calculated during a calibration phase and need not be repeated, the transform being stored in a computer.

Note that the function of the boom 115 may be performed by various alternative devices besides a single element mounted on a bearing 105 that pivots out. For example, alternatively, the boom could be a telescoping structure that would, when extended directly out in front of the cameras 100 and 105, place the markers in specified positions.

Figure 2:
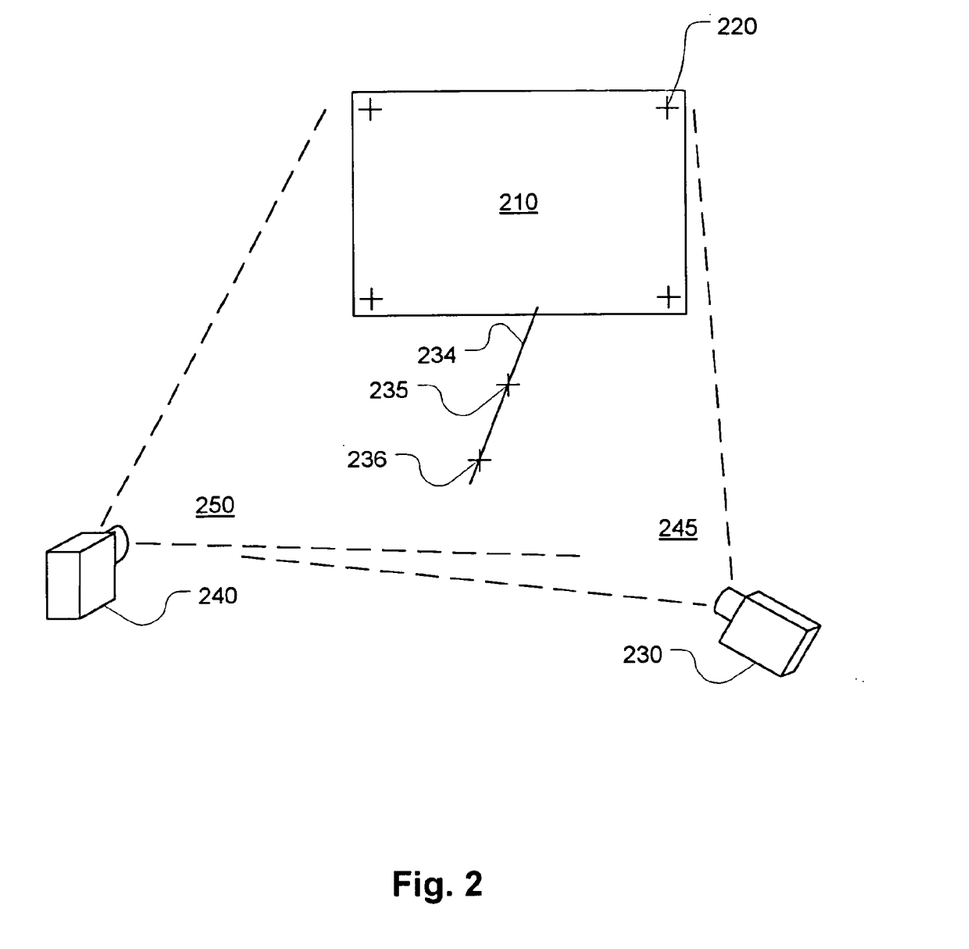
FIG. 2 is an illustration of features common to various embodiments of the invention.

Referring to FIG. 2, the invention may also be implemented using a set up where the cameras view a reference plane 210 with four marks 220 on it. The points may be projected on a wall by a laser scanner. Alternatively, a screen containing the marks may be temporarily set up in front of the cameras. In the latter case, the screen's location is the reference plane and all coordinates are defined with respect to it.

Figure 3:
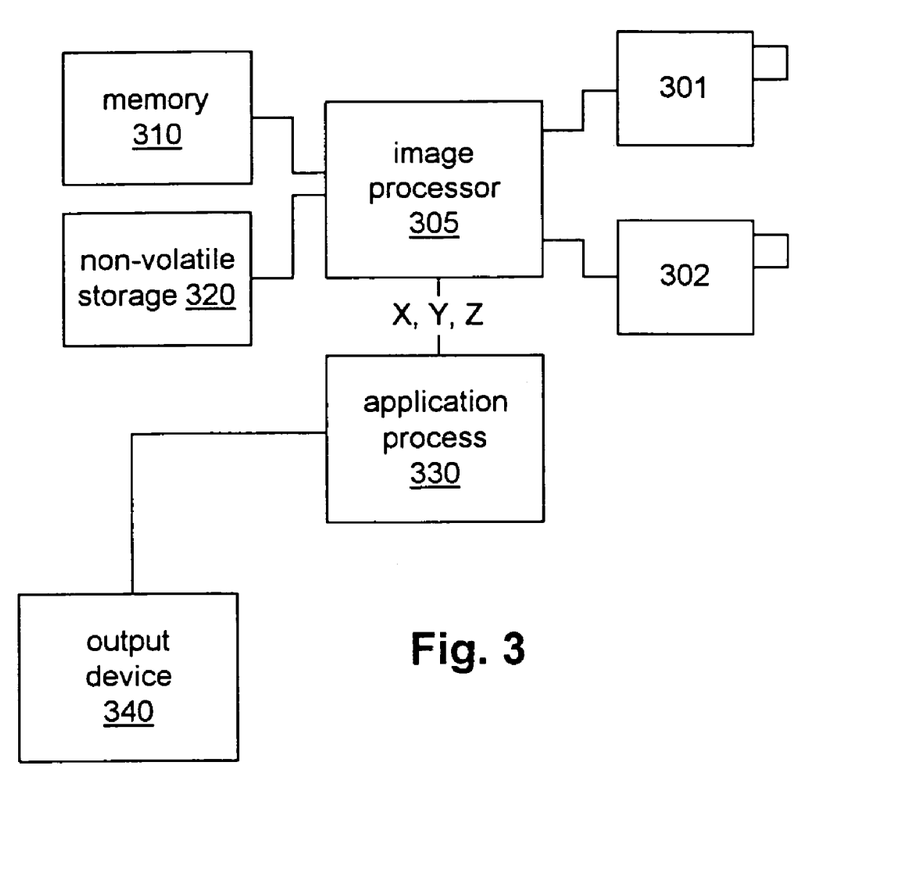
FIG. 3 is an illustration of a computer system that may be used to implement the invention.

Referring to FIG. 3, the invention may be implemented by an image processor 305 connected to the cameras 301, 302, etc. An application process 330 may make use of the three-dimensional information. As mentioned above, the application process may be a user-interface that recognizes gestures, the creation of three-dimensional models for use in analysis or animation, or any process that can make use of three-dimensional shape or position information. Particular features in each two-dimensional image of a camera can be selected by any of various methods that are known. Many of the techniques of two dimensional image analysis and classification may be used to identify a point in one image with a point in another and a discussion of this topic is outside the scope of this document. One example method that may be used to identify points in two images that corresponds to the same three-dimensional feature is to simply identify the feature points in each image and calculate a two-dimensional intensity correlation within a kernel about each one. The image processor 305 may make use of memory 310, non-volatile storage 320, and an output device 340.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Unless otherwise expressly indicated, when used throughout this document the term "substantially" shall have the meaning of "approximation", not "magnitude"; i.e., it shall have the meaning, "being largely but not wholly that which is specified." See, *Websters Ninth New Collegiate Dictionary*, Merriam-Webster Inc., 1989. Hence, applicant is not using the term "substantially" to denote "considerable quantity" or "significantly large," but is instead using the term as a qualifier/minimizer of a term. For example, in the phrase "the head portion is substantially above the body portion," "substantially above" is meant to indicate that while most of the head portion can be located above the body portion, there is certainly at least some of the head portion located in planes with the body portion, or even below parts of the body portion. As a further example, the phrase "substantially hollow," is meant to indicate that the item is almost totally hollow, but there might be small areas where it is not. These examples are meant to be illustrative of the meaning to be attributed to the term "substantially" as used throughout this document even if these particular phrases are not found herein.

The invention claimed is:

1. A strap-down three-dimensional reconstruction system, comprising:
    a jig supporting at least two cameras;
    the jig having a structure to support at least two calibration markers in a position to be substantially visible by each of the at least two cameras; and
    the jig also supporting at least four reference markers in a visual field of each of the at least two cameras, all of the reference markers lying in a common plane.

2. A system as in claim 1, wherein the four reference markers are corners of an aperture in a screen of the jig.

3. A system as in claim 1, wherein the four reference markers are projected onto a screen.

4. A system as in claim 1, further comprising an image processing computer connected to receive the images from the cameras and programmed to calculate a position of a point visible in each of the cameras responsively to position data corresponding to the calibration markers.

5. A system comprising:
    a support that is configured to support at least two optical detection devices,
    a screen that includes at least two apertures, the support being arranged such that a field of view of each of the optical devices includes a corresponding aperture of the at least two apertures and overlaps at least a field of view of at least one other of the at least two optical devices, and
    a processor that is configured to determine a relative location of an object based on an image of the object in at least two fields of view and based on an image of the screen acquired from a direction a substantially orthogonal to the screen.

6. The system of claim 5, further comprising:
    a structure that is configured to provide one or more calibration markers positioned at two known distances from the screen,
    wherein
    the processor is further configure to determine a distance of the object from the screen, based on one or more images of the one or more calibration markers at the two known distances from the screen.

7. The system of claim 6, wherein
    the structure includes a boom that is deployable to position the one or more calibration markers at the two known distances from the screen.

8. The system of claim 5, wherein
    the processor determines the relative location of the object independent of any physical dimensions of the system.

9. The system of claim 5, further including at least two cameras corresponding to the at least two optical devices.

10. The system of claim 9, wherein
    the processor determines the relative location of the object independent of optical settings of the at least two cameras.

11. The system of claim 5, further including the at least two optical detect devices.

12. A method of determining a location of an object, comprising:
    providing a screen with at least two apertures,
    providing an image of the screen with the at least two apertures, acquired from a direction substantially orthogonal to the screen, providing at least two images, each image including a view of edges of a corresponding aperture of the at least two apertures and a view of the object within the edges of the corresponding aperture, and determining the location of the object relative to the screen based on the image of the screen and the at least two images.

13. A method as claimed in claim 12, further including:

providing at least one image of one or more calibration markers located at two known distances from the screen, and determining a distance of the object relative to the screen based on the at least one image of the one or more calibration markers at two known distances from the screen.

14. The system of claim 12, wherein determining the location of the object is independent of physical dimensions related to sources of the at least two images.

* * * * *